(12) United States Patent
Hershey et al.

(10) Patent No.: US 8,089,846 B2
(45) Date of Patent: Jan. 3, 2012

(54) METHOD AND SYSTEM FOR MODULATION CODING AND SYNCHRONIZATION

(75) Inventors: John Erik Hershey, Ballston Lake, NY (US); Nick Andrew Van Stralen, Bloomfield, NY (US); Harold Woodruff Tomlinson, Jr., Ballston Spa, NY (US); John Anderson Fergus Ross, Niskayuna, NY (US); Zhiyuan Ren, Malta, NY (US); Zexin Pan, Madison, AL (US); Victor Petrovich Ostroverkhov, Ballston Lake, NY (US); Xiaolei Shi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 426 days.

(21) Appl. No.: 12/336,399

(22) Filed: Dec. 16, 2008

(65) Prior Publication Data

US 2010/0149958 A1    Jun. 17, 2010

(51) Int. Cl.
    *G11B 7/00* (2006.01)
(52) U.S. Cl. ........................................ 369/103
(58) Field of Classification Search .............. 369/103, 369/275.3, 275.1, 275.4; 359/3, 2, 1, 9, 10, 359/11, 29, 32, 33; 430/2, 1; 365/125
    See application file for complete search history.

(56) References Cited

U.S. PATENT DOCUMENTS

| | | | |
|---|---|---|---|
| 5,450,218 A | 9/1995 | Heanue et al. | |
| 5,510,912 A | 4/1996 | Blaum et al. | |
| 5,727,226 A | 3/1998 | Blaum et al. | |
| 5,740,184 A * | 4/1998 | Heanue et al. | 714/746 |
| 5,808,998 A | 9/1998 | Curtis et al. | |
| 5,877,873 A * | 3/1999 | Bashaw et al. | 359/10 |
| 5,940,537 A * | 8/1999 | Regen et al. | 382/210 |
| 6,064,586 A * | 5/2000 | Snyder et al. | 365/125 |
| 6,175,317 B1 | 1/2001 | Ordentlich et al. | |
| 6,414,296 B1 * | 7/2002 | Edwards | 250/208.1 |
| 6,549,664 B1 | 4/2003 | Daiber et al. | |
| 6,563,779 B1 | 5/2003 | McDonald et al. | |
| 6,711,711 B2 | 3/2004 | Hwang | |
| 6,738,322 B2 | 5/2004 | Amble et al. | |
| 6,889,907 B2 | 5/2005 | Roh | |

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Tan X Dinh
(74) *Attorney, Agent, or Firm* — Fletcher Yoder

(57) ABSTRACT

The present techniques provide systems and methods for modulation coding of data on optical disks, such as holographic data disks, and techniques for reading that data back from the disks. The techniques involve parsing a bit stream into a sequence of individual bit-patterns, and then using the individual bit patterns to select a symbol, or matrix, from a lookup table of previously selected matrices. The symbols are selected according to predetermined criteria that may help make the disk more resistant to interferences and errors, such as surface scratches, and the like. For example, criteria that may be used to select the symbols are the number of reflective and non-reflective regions within each matrix, and the number of sequential reflective regions, among others. The symbols may be written to the disk in a two-dimensional fashion, e.g., across adjacent tracks, or in a three-dimensional fashion, e.g., across adjacent data layers.

9 Claims, 5 Drawing Sheets

U.S. PATENT DOCUMENTS

| | | |
|---|---|---|
| 7,020,054 B2 | 3/2006 | Kadlec et al. |
| 7,388,695 B2 | 6/2008 | Lawrence et al. |
| 7,474,782 B2 * | 1/2009 | Kang .................... 382/154 |
| 2001/0055259 A1 * | 12/2001 | Goto et al. ............. 369/59.17 |
| 2002/0051273 A1 * | 5/2002 | Phua et al. ................ 359/200 |
| 2003/0039000 A1 * | 2/2003 | Tanaka et al. ............... 359/22 |
| 2005/0136333 A1 | 6/2005 | Lawrence et al. |
| 2006/0073392 A1 | 4/2006 | Erben et al. |
| 2006/0078802 A1 | 4/2006 | Chan et al. |
| 2007/0097469 A1 | 5/2007 | Erben et al. |
| 2007/0146835 A1 | 6/2007 | Erben et al. |
| 2008/0055686 A1 | 3/2008 | Erben et al. |
| 2008/0144145 A1 | 6/2008 | Boden et al. |
| 2008/0144146 A1 | 6/2008 | Boden et al. |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2—5:00.

U.S. Appl. No. 12/336,414, filed Dec. 16, 2008, John Anderson Fergus Ross et al.

U.S. Appl. No. 12/337,457, filed Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

U.S. Appl. No. 12/342,794, filed Dec. 23, 2008, John Anderson Fergus Ross et al.

U.S. Appl. No. 12/343,204, filed Dec. 23, 2008, Ruediger Kusch.

U.S. Appl. No. 12/346,279, filed Dec. 30, 2008, Victor Ostroverkhov et al.

U.S. Appl. No. 12/346,378, filed Dec. 30, 2008, Xiaolei Shi et al.

U.S. Appl. No. 12/347,178, filed Dec. 31, 2008, Victor Ostroverkhov et al.

U.S. Appl. No. 12/347,211, filed Dec. 31, 2008, Xiaolei Shi et al.

* cited by examiner

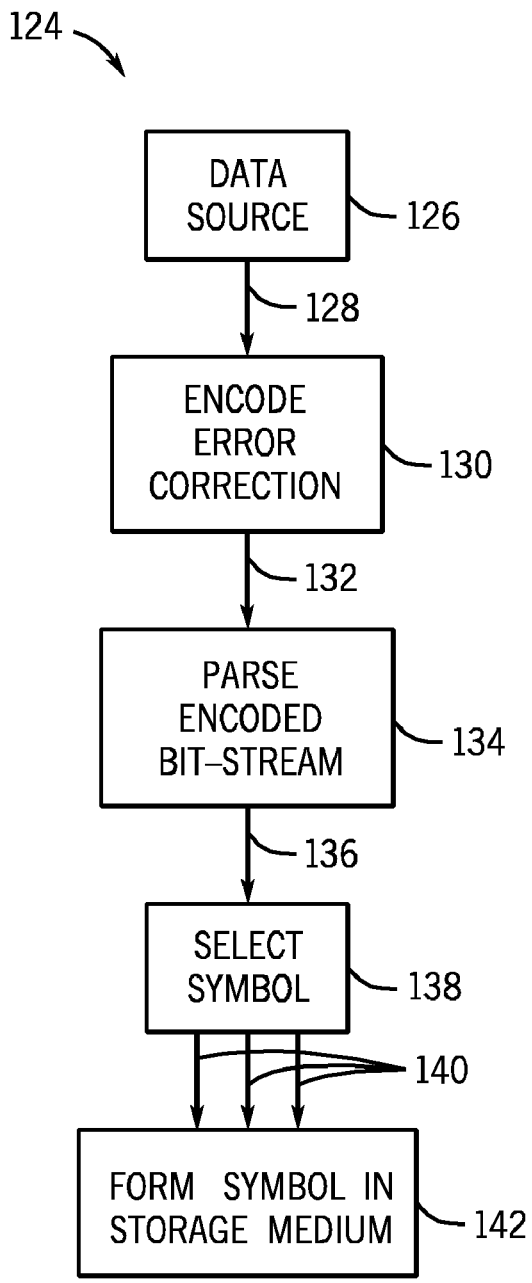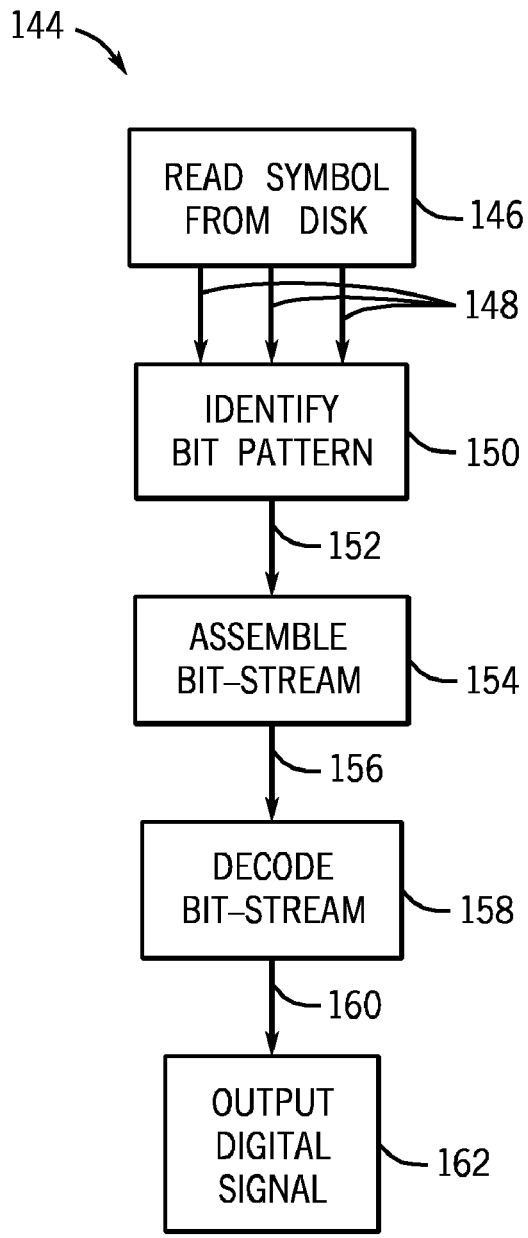
FIG. 6
FIG. 7

METHOD AND SYSTEM FOR MODULATION CODING AND SYNCHRONIZATION

BACKGROUND

The present techniques relate generally to bit-wise holographic data storage techniques. More specifically, the techniques relate to methods and systems for modulating and demodulating bit streams for storage on optical disks.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, as is the case for all optical storage media, they may be vulnerable to interferences between the closely spaced bits in adjacent tracks and layers. Accordingly, techniques that balance the intensity of light reflected from bits spaced over the surface of the disk may be advantageous.

BRIEF DESCRIPTION

A contemplated embodiment of the present techniques provides a method for storing data on a storage medium. The method includes dividing a stream of bits into sequential subsets, wherein each sequential subset contains an equal number of bits and selecting a unique matrix from a list of matrices based on a bit pattern of each sequential subset. Each of the matrices in the list meets a preferential criterion and the list of matrices is indexed by the bit pattern. A matrix pattern corresponding to the selected symbol is formed in a storage medium.

Another contemplated embodiment provides a method for reading data stored on a storage medium. The method includes detecting a sequence of m×m matrix patterns stored on an optical storage medium, and determining the characteristic polynomial of each sequential m×m matrix pattern, the characteristic polynomial of a subset of each sequential m×m matrix, or both. Each sequential m×m matrix pattern is matched to a stored pattern in an indexed table of possible m×m matrix patterns. An index number is identified for each sequential m×m matrix pattern and a bit-pattern is associated with each identified index number. The bit-patterns are assembled into a bit-stream comprising a sequential series of the bit-patterns.

Another contemplated embodiment provides a reader for optical storage media. The reader includes an optical excitation device configured to focus a laser beam on a data storage unit and an optical detector configured to detect a reflected light beam from the data storage unit. The optical detector is also configured to detect a series of sequential m×m matrix patterns in the reflected light beam. The reader includes a demodulator configured to determine the characteristic polynomial of each sequential m×m matrix pattern, or the characteristic polynomial of a subset of each sequential m×m matrix, or both. The demodulator is configured to match each sequential m×m matrix pattern to a stored pattern in an indexed table of possible m×m matrix patterns, identify an index number for each sequential m×m matrix pattern, associate a bit-pattern with each identified index number, and assemble a bit-stream comprising a sequential series of the bit-patterns. A decoder configured to remove any error-correction codes from the bit-stream, correct any errors identified in the bit-stream, and send the error corrected bit-stream to an output device is included. Finally, the reader will have an output device, configured to format the bit-stream and output the formatted bit-stream to an external unit.

In another contemplated embodiment, the present techniques provide an optical storage disk that includes a recording surface made of a photosensitive media. A plurality of micro-holograms is encoded into the photosensitive media.

The presence of a micro-hologram indicates a first bit-state, and the absence of a micro-hologram indicates a second bit-state. The plurality of micro-holograms is arranged in sequential m×m matrix patterns.

DRAWINGS

These and other features, aspects, and advantages of the present techniques will become better understood when the following detailed description is read with reference to the accompanying drawings in which like characters represent like parts throughout the drawings, wherein:

FIG. 6 is a flow chart of a method for writing data from an optical data disk, in accordance with embodiments of the present technique; and FIG. 7 is a flow chart of a method for reading data to an optical data disk, in accordance with embodiments of the present technique.

DETAILED DESCRIPTION

Figure 1:
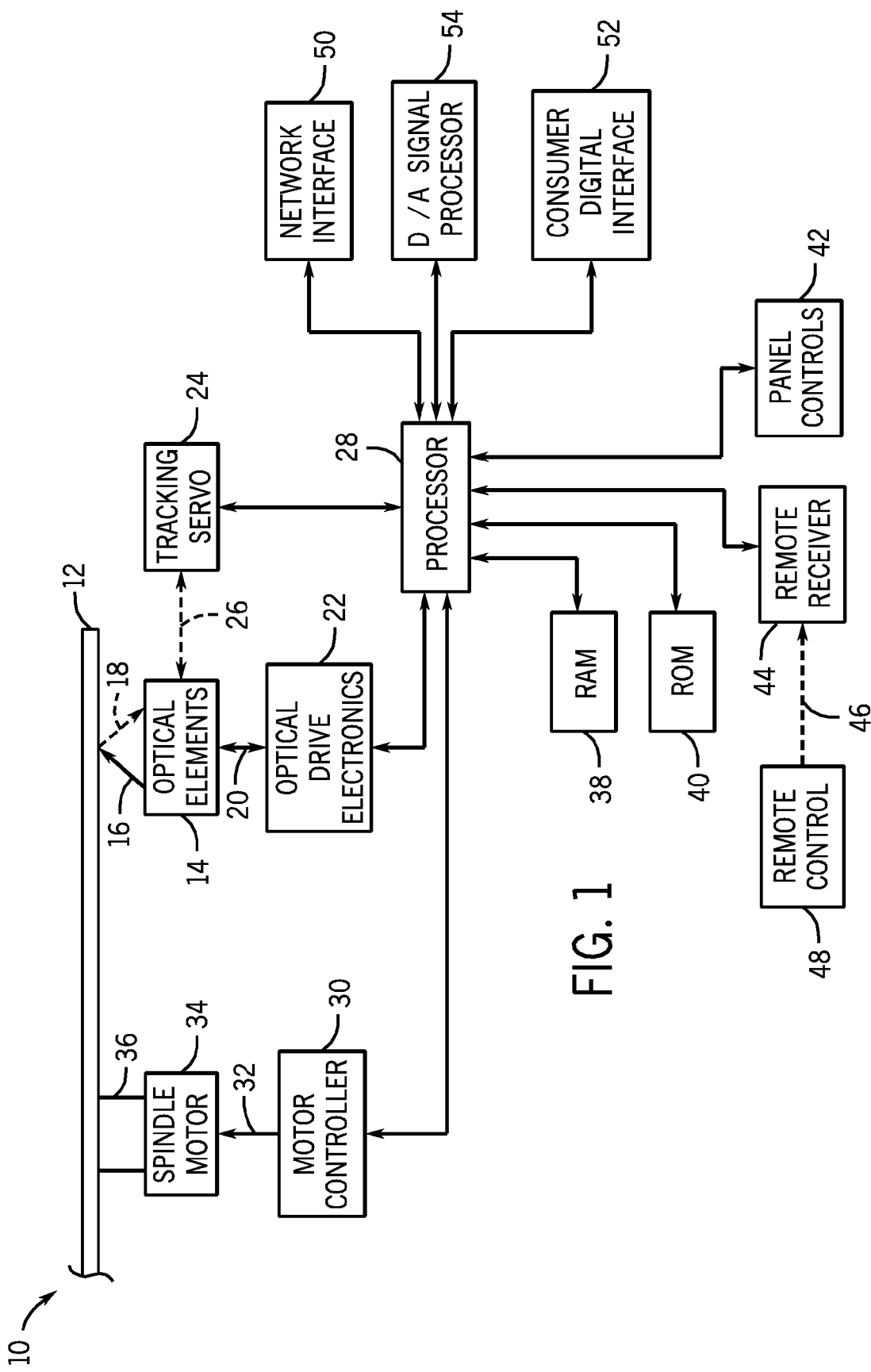
FIG. 1 is a block diagram of an optical disk reader, in accordance with an embodiment of the present techniques.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Optical storage systems typically involve two separate encodings of the data bits to be stored. A first encoding is generally a forward error correcting code (FEC), such as the Reed-Solomon (RS) block-based error correcting code used in compact disks (CDs). RS code may protect k data symbols, each containing s bits, to form n-k encoded symbols, with each encoded symbol also comprising s bits. The RS code is capable of correctly decoding a codeword with up to t corrupted, but unidentified, symbols where 2t=n-k. RS coding may also deal efficiently with erasures, e.g., those symbols somehow known to be corrupted. If there are s errors and r erasures, the RS code may correctly decode the codeword so long as 2s+r<2t.

The second encoding generally used in optical storage systems may be termed "modulation coding." Modulation coding is the representation of the bits resulting from the first (e.g., RS) coding in a set of bit-sequences, or symbols, chosen to mitigate some undesirable effects that may be associated with the reading process. The symbols are then written to an optical data storage unit. For optical systems based on variations in height of a reflective surface, e.g., pits and lands, such as CDs, the symbols have generally been linear bit-sequences chosen to limit the number of sequential zeros or ones in a particular data track on an optical storage disk. Examples of such techniques include the eight-to-fourteen modulation (EFM) used for CDs, and the EFM+ modulation used for digital versatile disks (DVDs). However, these coding techniques are not necessarily the most efficacious modulation coding techniques for other storage media, such as holographic data disks.

In holographic data disks, the total amount of light reflected from a region of the disk may affect the number of errors from that location. For example, as each micro-hologram may have a slightly different reflectivity from other micro-holograms, the average error from disk locations having large numbers of micro-holograms, such as in 90% of the bit positions, may be higher than regions having fewer micro-holograms, such as in 10% of the bit positions.

The present techniques provide systems and methods for modulation coding, e.g., selecting appropriate symbols for data representation, on optical disks, such as holographic data disks, and techniques for reading that data back from the disks. The techniques involve parsing a bit stream into a sequence of individual bit-patterns, and then using the individual bit patterns to select a matrix to be used as a symbol, from a lookup table of previously selected matrices. The matrices are selecting according to predetermined criteria that may help make the disk more resistant to interferences and errors, such as surface scratches and the like. For example, criteria that may be used to select the matrices are the number of reflective and non-reflective regions within each matrix and the number of sequential reflective regions. The matrices may be written to the disk in a two-dimensional fashion, e.g., across adjacent tracks, or in a three-dimensional fashion, e.g., across adjacent data layers.

The matrices that may be selected may be square m×m matrices, wherein m may be 2, 3, 4, 5 or larger. The use of square matrices may allow for faster demodulation while reading the disk, since a soluble characteristic polynomial exists for each matrix. More specifically, if each location in the matrix represents either a one or a zero, using modulo-2 math, the characteristic polynomials will be limited to a number of identifiable classes, wherein each class will contain a number of the matrices. Thus, identifying the characteristic polynomial may limit the search for the matrix pattern, leading to faster identification of the pattern.

Further, the present techniques may also provide techniques for synchronization, or proper spatial framing, of the modulation codeword boundaries. The use of the techniques for synchronization may decrease errors during disk reading by providing a feedback technique for correcting the synchronization. This technique is based on the identification, or lack of identification, of the expected matrices. If no identification is made, the synchronization may be adjusted in bit or track increments to regain synchronization.

An Optical Disk Reader

Turning now to the figures, FIG. 1 is an optical reader system 10 that may be used to read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disk may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
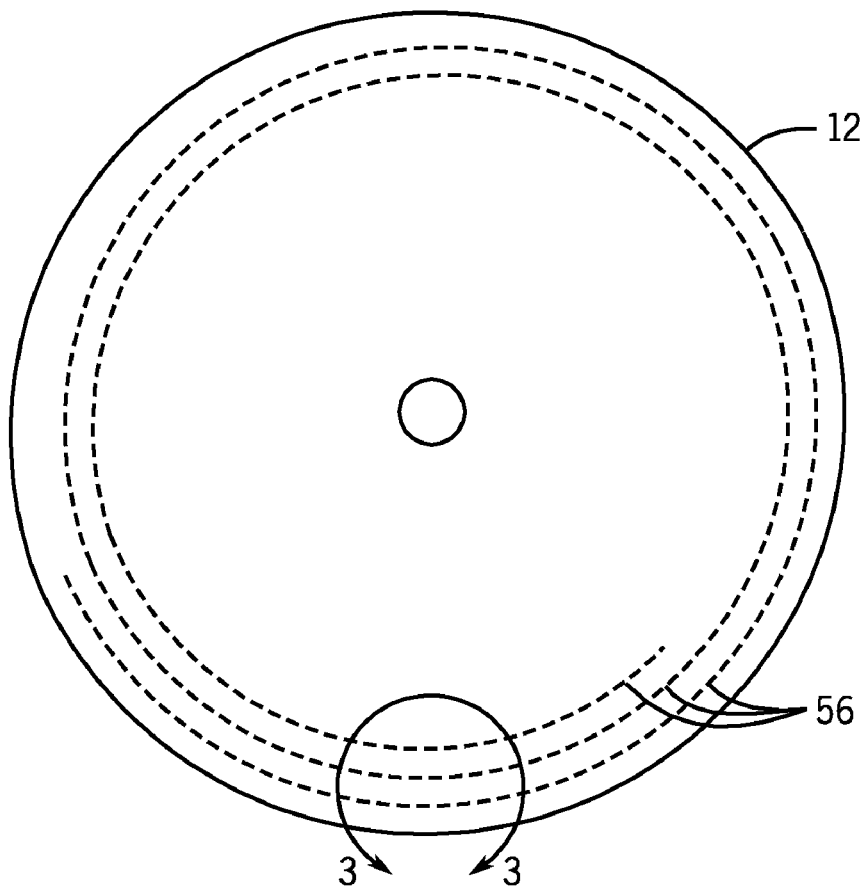
FIG. 2 illustrates an optical disk having data tracks, in accordance with an embodiment.
Figure 3:
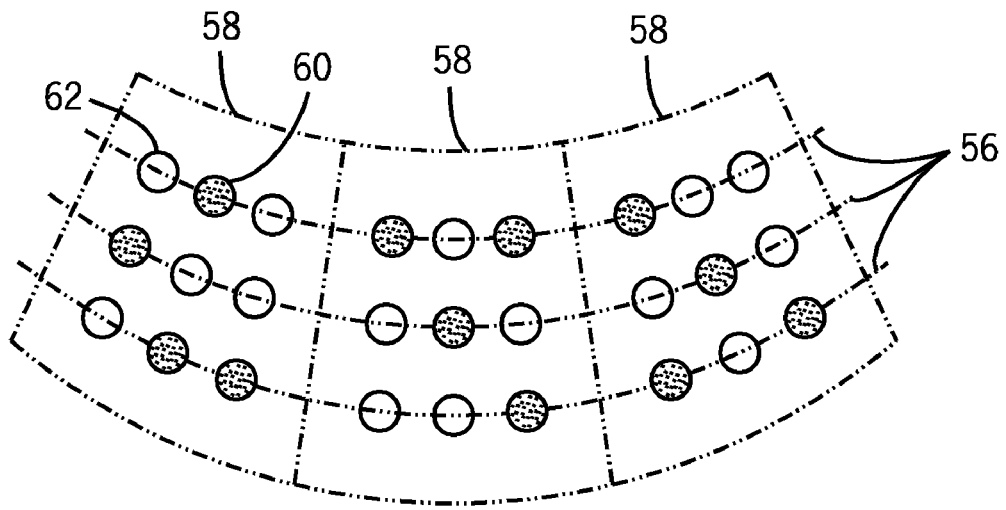
FIG. 3 is a close-up view of the tracks of an optical data disk, illustrating the writing of symbols across adjacent tracks, in accordance with an embodiment.

The reader 10 may be used to read an optical data disk 12 containing data as shown in FIG. 2. The data may be generally written in a sequential spiraling track 56 from the outer edge of the disk 12 to an inner limit, although circular tracks, or other configurations, may be used. Symbols 58 may be written across adjoining points in the track 56, as shown in FIG. 3. In the figure, each symbol 58 is represented as a 3×3 matrix of micro-reflectors, wherein the presence of a micro-reflector may represent a binary one 60, and the absence of a micro-reflector may represent a binary zero 62. In the illustration shown in FIG. 3, all of the symbols 58 have a density of 4, in other words, all of the symbols 58 have 4 binary ones 60. The symbols 58 do not have to be written across adjacent sections of the data track 56, but may be written across adjacent layers.

An Example of an Optical Element for Parallel Reading of Disks

Figure 4:
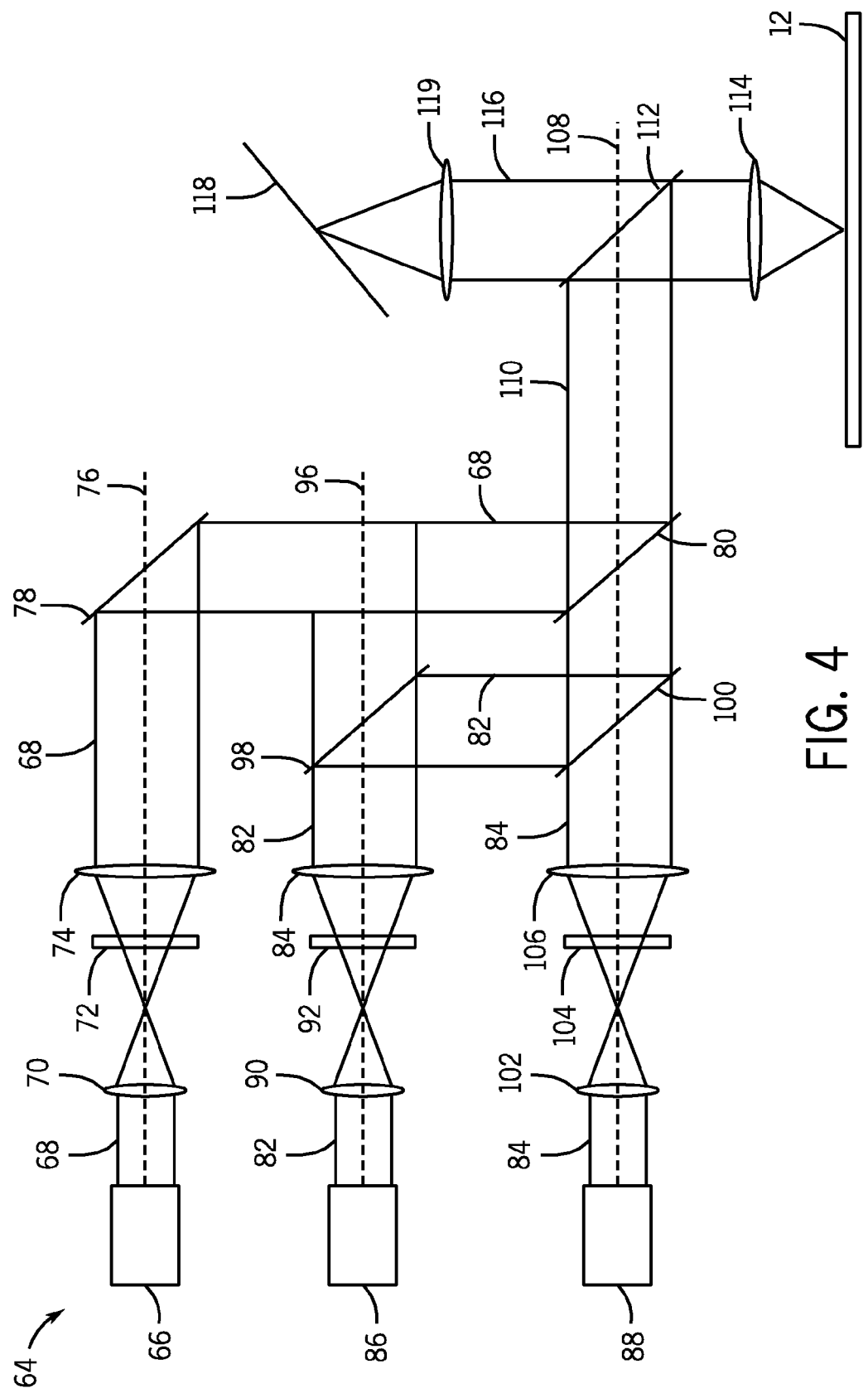
FIG. 4 is a schematic view of a read head that may be used to read a three track array, in accordance with an embodiment.

The symbols 58 discussed with respect to FIG. 3 may be read sequentially, such as by a reader that detects bits in each individual track. Alternatively, the symbols 58 may be read in parallel, such as by the parallel reader 64 illustrated in the schematic diagram of FIG. 4.

In the parallel reader 64 a first laser 66 emits a first read beam 68. The first read beam 68 is focused by an optical lens 70 through a digital optical element or DOE 72. The DOE 72 adjusts the beam location to allow the scanning of a first track on the data disk 12. A second optical lens 74 collimates the first read beam 68 along a beam axis 76. A first mirror 78 directs the collimated read beam 68 towards a 50/50 silvered mirror 80, which aligns the read beam 68 with read beams 82 and 84 from additional lasers 86 and 88.

The second read beam 82 from the second laser 86 is similarly processed, passing through a focusing lens 90, prior to passing through a second DOE 92. As for the DOE 72, the second DOE 92 controls the beam location, to allow the second read beam 82 to read a second track on the data disk, wherein the second track is adjacent to the first track. A collimating lens 94 collimates the second read beam 82 along a second beam axis 96. A second mirror 98 directs the collimated second read beam 82 towards a partial beam splitter 100, which aligns the read second read beam 82 with the read beams 68 and 84 from the other lasers 66 and 88.

The third read beam 84 from the third laser 88 is also focused by a lens 102 through a third DOE 104, which is configured to align the third read beam 84 along a third data track that is adjacent to the first and second data tracks. The third read beam 84 is then collimated by another lens 106. The collimated third read beam 84 passes through the partial beam splitter 100, which aligns the third read beam 84 with the second read beam 82. The aligned read beams 82 and 84 pass through the 50/50 silvered mirror 80 which aligns the read beams 82 and 84 with the first read beam 68 along a combined read beam axis 108.

The combined read beams 110 are directed by a beam splitter 112 towards the optical disk 12. A detector lens 114 focuses the combined read beams 110 onto the surface of the optical disk 12. The detector lens 114 also collects and collimates reflected light returned from the surface of the optical disk 12. The reflected light 116 passes through the beam splitter 112 towards a detector 118. A final focusing lens 119 focuses the reflected light on the detector 118. The detector 118 may be a multi-pixel array to generally match the size of the symbols 58. For example, for the 3×3 matrices described as symbols herein, the detector 118 may include a 3×1 array, wherein each of the three pixels in the detector array is aligned with one of the three data tracks. Other configurations may be used for the detector 118 to increase the reliability of the bit prediction from the detector 118. For example, a 3×m array may be used as the detector 118, wherein the 3 rows of pixels are aligned with the data tracks 56, and the m columns of pixels is aligned along each data track.

Selection of a Symbol and Mathematics of Encoding and Decoding

The use of matrices as the symbols may provide a number of advantages over linear modulation schemes, such as EFM. More particularly, the matrix encoding may allow the data to be spread across adjacent data tracks, data layers, or both. This may provide a faster reading sequence as the data is recorded and read in a parallel fashion. Further, the data may be less vulnerable to scratches that may affect a single row.

Further benefits may be obtained by the use of square matrices. Using square matrices may make the data easier to decode, as a characteristic polynomial may be identified for a number of matrices, or class, which may allow for the encoding of data by the class number of the characteristic polynomial. Accordingly, identifying the characteristic polynomial may limit the search to that class. To illustrate the benefits of using a matrix as a modulation coding symbol, the use of 3×3 square matrices for modulation is discussed below. However, the present techniques are not limited to 3×3 matrices, as any m×m matrix may be used. The choice of the size of the matrix may generally be limited by the complexity of the reading and writing to the disk.

A 3×3 binary matrix, M, is generally of the form shown in eqn. 1.

$$M = \begin{pmatrix} m_{11} & m_{12} & m_{13} \\ m_{21} & m_{22} & m_{23} \\ m_{31} & m_{32} & m_{33} \end{pmatrix} \quad \text{eqn. 1}$$

In this matrix, the individual elements, $\{m_{ij}\}$, are zeros and ones. If all operations are done modulo 2, e.g., 0+0=1+1=0, 0+1=1+0=1, 0·0=0·1=1·0=0, 1·1=1, then the matrix M has a characteristic polynomial of the form presented in eqn. 2.

$$|M+\lambda I| = \lambda^3 + \lambda^2(m_{11}+m_{22}+m_{33}) + \lambda(m_{11}m_{22}+m_{11}m_{33}+\\ m_{22}m_{33}+m_{23}m_{32}+m_{12}m_{21}+m_{13}m_{31}) + m_{11}m_{22}m_{33}+\\ m_{11}m_{23}m_{32}+m_{12}m_{21}m_{33}+m_{12}m_{23}m_{31}+\\ m_{13}m_{21}m_{32}+m_{13}m_{22}m_{31} \quad \text{eqn. 2}$$

For a 3×3 matrix of binary numbers, there are $2^9$, or 512, different matrices. Although each of these matrices has an individual characteristic polynomial, there are only eight distinct characteristic polynomials, and thus many different matrices have the same characteristic polynomial, generally represented in eqn. 3.

$$\lambda^3 + \alpha_2 \lambda^2 + \alpha_1 \lambda + \alpha_0 \quad \text{eqn. 3}$$

Accordingly, the number of members in each class provides the population statistics displayed in Table 1 where the class number, v, is defined in eqn. 4.

$$v = 4\alpha_2 + 2\alpha_1 + \alpha_0 \quad \text{eqn. 4}$$

TABLE 1

Number of members in each class of a 3 × 3 matrix.

| Class Number v | Number of Matrices in Class |
|---|---|
| 0 | 64 |
| 1 | 56 |
| 2 | 112 |
| 3 | 24 |
| 4 | 112 |
| 5 | 24 |
| 6 | 56 |
| 7 | 64 |

The number of elements in each matrix that are ones or zeros do not have to be the same within each type of class. For example, Table 2 shows two different matrices from class number 6.

TABLE 2

Two matrices from class number 6.

| Matrix 1 | | | Matrix 2 | | |
|---|---|---|---|---|---|
| 1 | 1 | 1 | 0 | 0 | 0 |
| 1 | 1 | 0 | 0 | 0 | 1 |
| 1 | 1 | 1 | 0 | 1 | 1 |

Although both of the matrices in Table 2 have the same class number, 6, they have significantly different densities. As mentioned previously, the density of a matrix is defined as the number of binary ones that it includes. For example, matrix 1 in Table 2 has a density of 8, while matrix 2 has a density of 3. Table 3 displays some statistics respecting the distribution of matrix densities within the eight classes. The total number of matrices in a particular class v is denoted by $N_{TOTAL}(v)$.

TABLE 3

Number of 3 × 3 matrices having a particular density in each class.

| v | Number of matrices $N_{TOTAL}$ (v) | Average density | density ≦ 3 | density ≦ 4 | density ≦ 5 | density ≦ 6 |
|---|---|---|---|---|---|---|
| 0 | 64 | 4.13 | 25 | 31 | 43 | 61 |
| 1 | 56 | 5.14 | 2 | 8 | 38 | 56 |
| 2 | 112 | 4.18 | 36 | 78 | 96 | 100 |
| 3 | 24 | 5.50 | 0 | 6 | 12 | 18 |
| 4 | 112 | 3.96 | 57 | 75 | 81 | 105 |
| 5 | 24 | 5.50 | 0 | 6 | 12 | 18 |
| 6 | 56 | 4.71 | 6 | 30 | 48 | 50 |
| 7 | 64 | 4.88 | 4 | 22 | 52 | 58 |

As the ones and zeros in each matrix generally represent the presence or absence of micro-reflectors on a data layer, such as micro-holograms on a holographic data disk, the matrices that are to be used as symbols may be selected on the basis of the amount of light that may be reflected from the symbol, i.e., the density of binary ones 60 within the matrix. For example, the matrices may be selected so as to place an upper limit on the density, such as 4, 5, or 6, among others. Further, selection of the appropriate matrices may also provide a lower limit on the number of micro-reflectors within a single symbol, further controlling the amount of light reflected from the disk. For example, the matrices may have densities less than 6 but greater than 4. Even more uniform densities may be desirable, with the selection of matrices that have equivalent densities, such as 4 or 5. These preferential criteria, among others, may be used to decrease the interferences that may come from variations in the densities of individual symbols, or from other data layers.

The modulation code proceeds by first selecting a class number, v, where $0 \leq v \leq 7$. This allows for three bits from a data stream to be represented or encoded (e.g., the number of bits, m, is equal to 3). As the matrices may be larger matrices, it would provide m bits in general as there are $2^m$ classes of square matrices of dimension m×m containing only zeros and ones with arithmetic performed modulo 2. Additional bits may generally be represented or encoded by selecting one of the matrices within the class selected.

As an example, the matrices in each class may be ordered by increasing density. Symbols may then be selected from the matrices in each class that are limited to those N(v) matrices exhibiting a density less than a specified threshold. If only the first $\lfloor \log_2 N(v) \rfloor$ matrices are used from each class, $N(v) \leq N_{TOTAL}(v)$, then selection of the matrices from each class will provide, on average, $$\frac{1}{8}\sum_{v=0}^{7} \lfloor \log_2 N(v) \rfloor$$

bits for representing or encoding bits from the data stream. For the present example, with a specified threshold of 5, an average of 4.75 bits may be provided for encoding, as displayed in Table 3. The results of the calculation are displayed in Table 3 along with the average density of the modulation coding densities.

In this example, the average total number of bits available for encoding per modulation symbol is 7.75, including 3 bits from the choice of v and 4.75 bits from the choice of the matrix. As each 3×3 matrix contains nine bits, the example shows an encoding efficiency of about 86%. Further, the modulation matrices in the example have an average density of 3.717 per encoding symbol, and thus the scattered light will be about 17% less than would be the case were no modulation coding performed.

Figure 5:
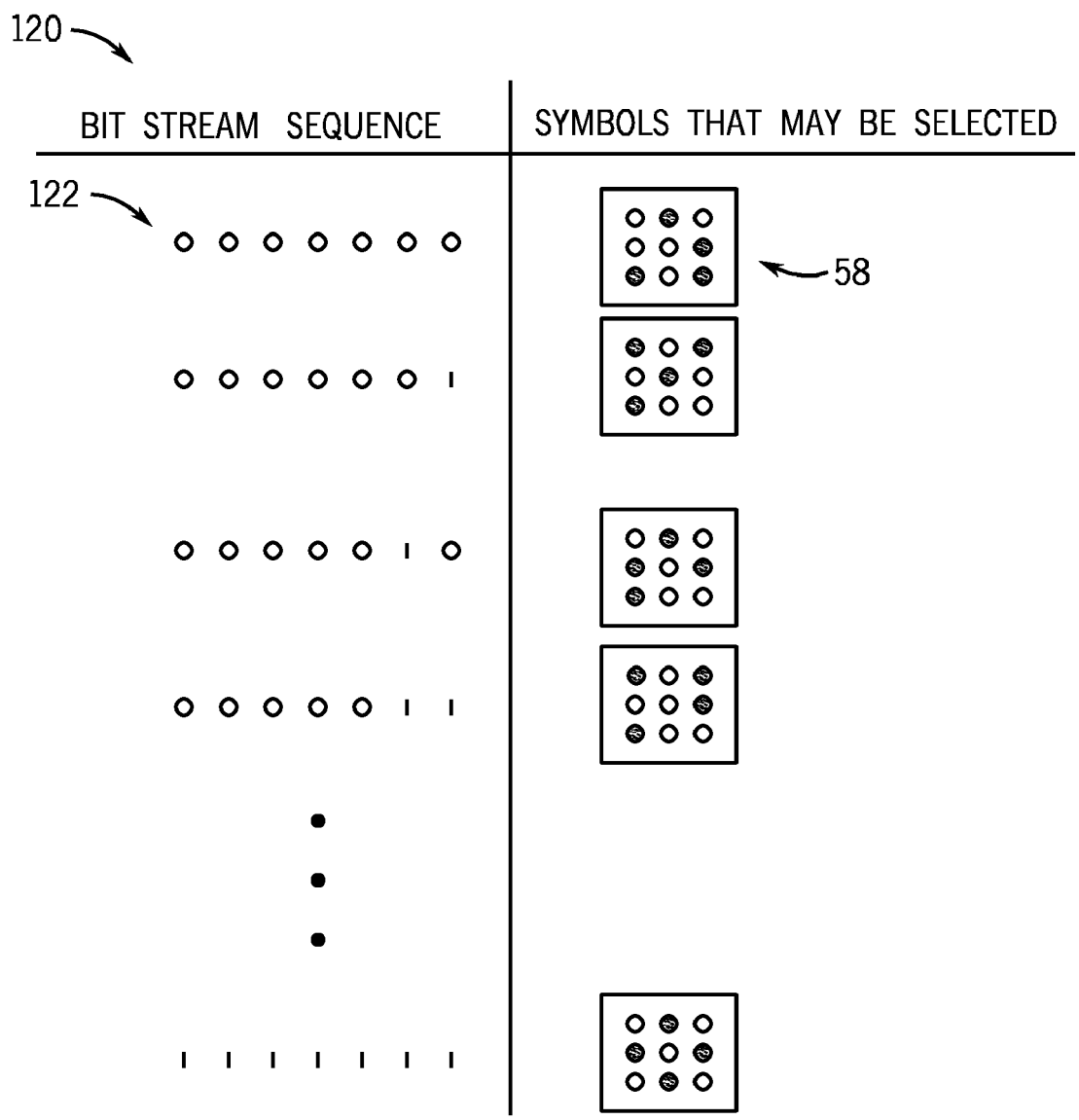
FIG. 5 is an illustration of a lookup table that may be used to choose an appropriate matrix symbol for a sequence of bits, in accordance with an embodiment.

The matrices used as the symbols may be selected before use, and stored in a look-up table 120, as shown in FIG. 5. During the encoding operation, the data-stream is divided into sequential bit sequences 122 having equal numbers of bits. The bit sequences 122 are used as index numbers to identify previously selected symbols 58 for each bit sequence.

TABLE 3

Average information and densities for encoding matrices with density ≦5

| v | $N_{TOTAL}(v)$ | density ≦ 5 | $\lfloor \log_2 N(v) \rfloor$ | Ave. Density |
|---|---|---|---|---|
| 0 | 64 | 43 | 5 | 2.406 |
| 1 | 56 | 38 | 5 | 4.688 |
| 2 | 112 | 96 | 6 | 3.344 |
| 3 | 24 | 12 | 3 | 4.250 |
| 4 | 112 | 81 | 6 | 2.734 |
| 5 | 24 | 12 | 3 | 4.250 |
| 6 | 56 | 48 | 5 | 3.875 |
| 7 | 64 | 52 | 5 | 4.188 |
|   |   |   | avg. = 4.75 | avg. = 3.717 |

Decoding of the symbols is performed simultaneously with synchronization. For example, in the present example, the reader decodes successively read binary matrices. If the matrices are square m×m matrices, as discussed above, the characteristic polynomial of the matrix may be computed to obtain the class number v. The matrix is then compared to the possible matrices within that class number in a look-up table, wherein the viable candidates of the N(v) matrices are searched for a match. If a match is found, the decoder assumes it has correctly recovered $3+\lfloor \log_2 N(v) \rfloor$ encoded bits. However, if no match is found, the reader assumes that at least one bit has been read or written in error or that the proper spatial framing of the modulation codeword boundaries is not correct, e.g., the reader is not in synchronization with the data. The reader may then be adjusted within one bit increments, such as forward, backward, or side-to-side, until the matrices match the expected combinations of characteristic polynomials with matrix patterns. Thus, the method provides a useful tool for determining and adjusting the synchronization.

Encoding a Data Disk

The techniques described herein may be used to encode data for storage on an optical data disk by the process 124 shown in the block diagram of FIG. 6. Referring also to FIG. 5, the encoding process 124 begins with a data source 126 providing a digital signal 128 to be stored on the optical data disc. The digital signal 128 may be encoded with an error correction code, as shown in block 130. For example, a Reed Solomon (RS) encoding scheme may be used to allow for the correction of errors during the reading or writing process. RS encoding incorporates redundant bits to allow for the correction of errors during the reading or writing process. Other error encoding techniques may be used in block 130 to encode the digital signal 128, including, for example, circular codes such as feed forward codes and recursive systematic codes.

The encoded bit stream 132 may then be parsed as shown in block 134. Parsing of the encoded bit stream 132 generally involves breaking the encoded bit stream 132 up into a sequence of bit patterns 136 of equivalent length. The length of each bit pattern 136 may be chosen on the basis of the amount of data that the set of symbols are capable of storing.

The parsed bit pattern 136 is then used in block 138 to select a symbol 58 representing that bit pattern 136. The symbol 58 may be transmitted by a series of bit patterns 140, which may be then translated into a two dimensional matrix on the data storage surface of a disk, wherein the ones and zeros may be represented by the presence or absence of micro-reflectors. For example, a one may be represented by the presence of a micro-hologram while a zero may be represented by the absence of a micro-hologram. The symbol is then formed in the storage medium as shown in block 142.

Forming the symbol in the storage medium may be performed by constructive interference of two laser beams at each site that a micro-hologram is to be formed. The constructive interference of the two beams may, for example, change the refractive index at the point the micro-hologram is formed. Different materials may be used for the storage layer, including for example, photosensitive materials that have a chemical reaction upon irradiation with the crossed beams, or materials that have a physical phase change upon irradiation. Examples of procedures that may be used with different materials include those presented in U.S. patent application Ser. No. 7,388,695 B2, included herein by reference in its entirety. However, if any terms, definitions or usages conflict between these applications and the present application, the terms, definitions and usages in the present application take precedence.

Decoding a Data Disk

A process 144 by which the optical reader system 10 may read data from an optical data disc is shown in the block diagram of FIG. 7. Referring also to FIG. 5, the process 144 begins in block 146 with reading a symbol 58 from the storage unit, e.g., the optical data disc. The symbol 58 may include, for example, the matrix pattern that has been selected to represent a certain bit sequence, as described herein.

The symbol 58 identified in block 146, is then sent to block 150 over one or more lines 148 indicating parallel bits. In block 150 a unique bit pattern 152 corresponding to the symbol 58 is identified. This identification of the bit pattern 152 may take place by looking up the symbol 58 in a look-up table or other similar storage.

As discussed above, if the symbol 58 is a symmetric m×m matrix, a characteristic polynomial may be calculated for the matrix, identifying the class number of the matrix, and potentially limiting the number of patterns that need to be searched. Once a bit pattern 152 has been identified, in block 154 the bit pattern 152 is assembled into a bit stream 156. The bit stream 156 is made up of sequentially concatenated bit patterns 152. The bit stream 156 may then be further processed, such as being decoded to remove any error correction coding that has been superimposed over the bit stream, as shown in block 158. This decoding may, for example, remove extra bits associated with Reed Solomon error correction among others. Upon decoding of the bit stream 158, a digital signal 160 is formed, which may then be output in block 162. For example, the digital signal may be provided to the network interface 50, the consumer digital interface 52, or converted into an analog data signal in the digital-to-analog signal processor 54, discussed with respect to FIG. 1.

While only certain features of the present techniques have been illustrated and described herein, many modifications and changes will occur to those skilled in the art. It is, therefore, to be understood that the appended claims are intended to cover all such modifications and changes as fall within the true spirit of the present techniques.

The invention claimed is:

1. A method for reading data stored on a storage medium, comprising:
    detecting a sequence of symbols stored on an optical storage medium, wherein each symbol is an m×m matrix pattern;
    determining one or more of a characteristic polynomial of each sequential m×m matrix pattern and a characteristic polynomial of a subset of each sequential m×m matrix pattern;
    matching each sequential m×m matrix pattern to a stored pattern in an indexed table of possible m×m matrix patterns;
    identifying an index number for each sequential m×m matrix pattern;
    associating a bit-pattern with each identified index number; and
    assembling a bit-stream comprising a sequential series of the bit-patterns.

2. The method of claim 1, comprising:
    forming a decoded bit-stream by reversing an error correction code imposed over the bit-stream;
    providing the decoded bit-stream as an output.

3. A reader for optical storage media, comprising:
    an optical excitation device configured to focus a laser beam on a data storage unit;
    an optical detector configured to detect a reflected light beam from the data storage unit, and to detect a sequence of symbols in the reflected light beam, wherein each symbol is an m×m matrix pattern;
    a demodulator configured to:
        determine one or more of a characteristic polynomial of each sequential m×m matrix pattern and a characteristic polynomial of a subset of each sequential m×m matrix;
        match each sequential m×m matrix pattern to a stored pattern in an indexed table of possible m×m matrix patterns;
        identify an index number for each sequential m×m matrix pattern;
        associate a bit-pattern with each identified index number; and
        assemble a bit-stream comprising a sequential series of the bit-patterns;
    a decoder configured to remove any error-correction codes from the bit-stream, correct any errors identified in the bit-stream, and send the error corrected bit-stream to an output device; and
    the output device, wherein the output device is configured to format the bit-stream and output the formatted bit-stream to an external unit.

4. The reader of claim 3, wherein the data storage unit is a holographic data disc.

5. The reader of claim 3, comprising an electro-optical light modulator configured to modulate a phase delay of the laser beam, the reflected light beam, or both.

6. The reader of claim 3, wherein the output device comprises a network interface, a high-definition multimedia interface (HDMI), a digital video output, a digital audio output, an analog video output, an analog audio output, or any combinations thereof.

7. The reader of claim 3, wherein the optical detector is configured to read multiple data tracks, or multiple data layers, or both, in a parallel fashion.

8. The reader of claim 3, comprising a tracking servo-motor mechanism configured to move the optical detector laterally to reach a data track, and to hold an alignment along the data track.

9. The reader of claim 3, comprising a tracker configured to adjust a tracking of the tracking servo-motor mechanism based on feedback from the demodulater, wherein if the sequential m×m matrix patterns are not in the indexed table of possible m×m matrix patterns, the tracking is adjusted in one bit increments until the sequential m×m matrix patterns match patterns in the indexed table of possible m×m matrix patterns.

* * * * *